United States Patent
Guo et al.

(10) Patent No.: US 11,149,115 B2
(45) Date of Patent: Oct. 19, 2021

(54) METHOD FOR PREPARING POLYLACTONE BY RING OPENING

(71) Applicant: NANJING TECH UNIVERSITY, Jiangsu (CN)

(72) Inventors: Kai Guo, Jiangsu (CN); Hui Zhu, Jiangsu (CN); Zhenjiang Li, Jiangsu (CN); Fulan Wei, Jiangsu (CN); Siming Chen, Jiangsu (CN); Yu Gao, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 145 days.

(21) Appl. No.: 16/607,654

(22) PCT Filed: Apr. 24, 2018

(86) PCT No.: PCT/CN2018/084180
§ 371 (c)(1),
(2) Date: Oct. 23, 2019

(87) PCT Pub. No.: WO2018/210106
PCT Pub. Date: Nov. 22, 2018

(65) Prior Publication Data
US 2020/0048409 A1   Feb. 13, 2020

(30) Foreign Application Priority Data

May 19, 2017   (CN) .......................... 201710361865.4

(51) Int. Cl.
*C08G 63/87* (2006.01)
*C08G 63/82* (2006.01)
*B01J 31/02* (2006.01)

(52) U.S. Cl.
CPC ........ *C08G 63/823* (2013.01); *B01J 31/0237* (2013.01); *C08G 63/87* (2013.01)

(58) Field of Classification Search
USPC ....................................... 528/196, 198, 354
See application file for complete search history.

(56) References Cited

FOREIGN PATENT DOCUMENTS

| CN | 103210015 A | 7/2013 |
|---|---|---|
| CN | 104592501 A | 5/2015 |
| CN | 105367760 A | 3/2016 |
| CN | 105367761 A | 3/2016 |
| JP | 2015017251 A | 1/2015 |
| WO | 2010100390 A1 | 9/2010 |
| WO | 2012049044 A2 | 4/2012 |

OTHER PUBLICATIONS

Norman Lu et al. A salt made of 4-N,N-dimethylaminopyridine (DMAP) and saccharin as an efficient recyclable acylation catalyst: a new bridge between heterogeneous and homogeneous catalysis.: Chem. Commun., 2011, 47, 7227-7229 (Year: 2011).*
Olivier Thillaye du Boullay et al. An Activated Equivalent of Lactide toward Organocatalytic Ring-Opening Polymerization; J. Am. Chem. Soc. 2006, 128, 51, 16442-16443 (Year: 2006).*
Marianne Labet et al. Synthesis of polycaprolactone: a review; Chemical Society Reviews . Issue 12, 2009 (Year: 2009).*
Fredrik Nederberg et al., "New Paradigms for Organic Catalysts: The First Organocatalytic Living Polymerization", Angewandte Chemie International Editon, 2001, vol. 40, No. 14, pp. 2712-2715.
Fredrik Nederberg et al., "Organocatalytic chain scission of poly(lactides): a general route to controlled molecular weight, functionality and macromolecular architecture", Chemical Communications, 2001, pp. 2066-2067.

* cited by examiner

*Primary Examiner* — Terressa Boykin
(74) *Attorney, Agent, or Firm* — Novick, Kim & Lee, PLLC; Allen Xue (57) ABSTRACT

Disclosed is a method for preparing polylactone by ring opening, belonging to the technical fields of organic catalysis and polymer materials. The invention proposes a new catalytic mechanism, wherein an organic alcohol is used as an initiator to initiate ring opening polymerization of a cyclic monomer under the catalysis of an organic catalyst to obtain a polylactone; and the catalyst is a pyridinium salt. The present invention has the advantages of non-toxic reaction, simple conditions and controllable process; further, the invention can obtain a narrow molecular weight distribution in the absence of solution polymerization, and can effectively inhibit the occurrence of the transesterification compared with the catalysis of 4-(N,N-dimethylamino)pyridine.

9 Claims, 3 Drawing Sheets

METHOD FOR PREPARING POLYLACTONE BY RING OPENING

TECHNICAL FIELD

The present invention belongs to the technical fields of organic catalysis and high polymer materials, and particularly relates to a method for preparing polylactones by ring opening catalysis using a pyridinium salt.

BACKGROUND ART

Polylactones are currently marketed as bio-based degradable materials, and have important application values in industrial production fields such as biodegradable plastics and medical fields such as surgical sutures, drug controlled release carriers, dental bone materials and the like due to the advantages of being recyclable and degradable, saving water, energy and raw material consumptions, reducing waste discharge and the like.

As for polylactic acid, two polymerization methods of direct polycondensation of lactic acid and ring opening polymerization of lactide are mainly used at present. In the process of synthesizing polyester by direct polycondensation of lactic acid, trace moisture in the reaction product is difficult to remove, resulting in a generally not high average relative molecular weight, and therefore limited in many applications. The ring opening polymerization of lactide is mainly catalyzed by metals in the past studies, but in recent years, the drawbacks brought by the use of metals as catalysts in the preparation of aliphatic polyesters are gradually exposed, and the development of polylactic acid in the fields of biomedicine and microelectronics is limited due to the metal residues in the products. Therefore, in recent years, many scholars have gradually turned the research goal to organic catalysis. DMAP is the first organic catalyst used in the polymer synthesis. Connor etc. (Fredrik Nederberg et al. Angewanfefte Chemie International Edition, 2001, 40, 2712-2715) reported the first achievement of an organocatalysis living polymerization under conditions of ethanol, isopropanol or benzyl alcohol as an initiator and DMAP or PPY as a catalyst to give a polylactic acid product with controllable activity and narrow molecular weight distribution.

Subsequently, the use of organic catalysts in polymerization has been rapidly developed, and nucleophiles such as N-heterocyclic carbenes, guanidines and phosphazenes have emerged, while DMAP has been found to work well in other heterocycles, including trimethylene carbonate, caprolactone and O-carboxylic acid lactonic acid. Unfortunately, DMAP has been found to have acute skin toxicity and the polymerization product obtained by bulk polymerization of lactide has a broad molecular weight distribution with significant transesterification. More research therefore tends to find alternatives to DMAP. Kadota etc. (Fredrik Nederberg, Eric F. Connor et al. *Chem. Commun.*, 2001, 2066-2067) proposed a synergistic catalytic mechanism of DMAP and DMAP HCl to catalyze ring opening polymerization of LA with preferably results, however, the use of DMAP still hasn't been completely replaced.

SUMMARY OF THE INVENTION

The present invention aims to provide a method for preparing polylactone by ring opening, which is simple and convenient in process and low in cost and has the advantages of simple condition, controllable process, no chain transesterification and narrow molecular weight distribution.

A method for preparing polylactone by ring opening comprises: an organic alcohol is used as an initiator to initiate ring opening polymerization of a cyclic monomer under the catalysis of an organic catalyst to obtain a polylactone;

The catalyst is a pyridinium salt, and has a structure of a general formula (I):

(I)

wherein X is selected from halogen or organic acid, wherein $R^1$, $R^2$, $R^3$ and $R^4$ are each selected from hydrogen, alkyl having 1-10 carbon atoms, alkyl having 1-10 carbon atoms and substituted by one or more of hydroxyl, phenyl and cyano; and $R^5$ is selected from one of hydrogen, N, N-dimethylamino, and N-pyrrolidinyl.

when $R^5$ is selected from hydrogen, $R^1$, $R^2$, $R^3$ and $R^4$ are selected from the same or different groups of hydrogen, methyl, ethyl or isopropyl, or alkyl of 1 to 4 carbon atoms substituted by one or more of hydroxyl, phenyl and cyano; and X is one selected from fluorine, chlorine, bromine, iodine, methanesulfonic acid, ethanesulfonic acid, p-toluenesulfonic acid, trifluoromethanesulfonic acid, trichloromethanesulfonic acid, trifluoroacetic acid, trichloroacetic acid, and benzenesulfonic acid;

when $R^5$ is selected from N, N-dimethylamino, or N-pyrrolidinyl, $R^1$, $R^2$, $R^3$ and $R^4$ are selected from the same or different groups of hydrogen, methyl, ethyl, isopropyl, tert-butyl, sec-butyl, or alkyl of 1 to 10 carbon atoms substituted with one or more of hydroxyl, phenyl and cyano; and X is one selected from fluoro, chloro, bromo, iodo, methanesulfonic acid, ethanesulfonic acid, p-toluenesulfonic acid, trifluoromethanesulfonic acid, trichloromethanesulfonic acid, trifluoroacetic acid, trichloroacetic acid and benzenesulfonic acid.

Representatively, Formula I can be a structure shown in Nos. 1-15.

| No. | Structure |
|---|---|
| 1 |  |
| 2 |  |

-continued

| No. | Structure |
|---|---|
| 3 | 4-(dimethylamino)pyridinium bromide |
| 4 | 4-(dimethylamino)-3-methylpyridinium chloride |
| 5 | 4-(dimethylamino)-2-ethyl-3-ethylpyridinium chloride |
| 6 | 4-(dimethylamino)-3,5-diisopropylpyridinium chloride |
| 7 | 4-(dimethylamino)-2,3,5,6-tetramethylpyridinium iodide |
| 8 | 4-(dimethylamino)-3,5-di-tert-butyl-2,6-dimethylpyridinium iodide |
| 9 | 4-(dimethylamino)-2,6-di-sec-butyl-3,5-dimethylpyridinium iodide |

-continued

| No. | Structure |
|---|---|
| 10 | 4-(pyrrolidin-1-yl)-3,5-dimethylpyridinium methanesulfonate |
| 11 | 4-(dimethylamino)-3,5-diethyl-2,6-dimethylpyridinium methanesulfonate |
| 12 | 4-(dimethylamino)-3-ethyl-2,5,6-trimethylpyridinium methanesulfonate |
| 13 | 4-(dimethylamino)-2,3,5,6-tetraethylpyridinium triflate |
| 14 | 4-(dimethylamino)-2,3,5,6-tetraisopropylpyridinium triflate |
| 15 | 4-(dimethylamino)-3-isopropyl-2,5,6-trimethylpyridinium triflate |

R in the initiator organic alcohol ROH is an alkyl or a phenyl group, and the alkyl is a linear, branched or cyclic chain having 1 to 22 carbon atoms.

The organic alcohol is methanol, ethanol, pentaerythritol, butynol, phenylpropanol or benzyl alcohol.

The cyclic monomer is selected from one of the following structures:

(1)

(II)

wherein A is [—($CR^1R^2$)—]$_n$, n is an integer from 2 to 10; $R^1$ and $R^2$ are selected from the same or different groups of H, an alkyl having 1 to 5 carbon atoms or an alkyl having 1 to 5 carbon atoms and substituted with a halogen atom or a hydroxyl group;

(2)

(III)

wherein A and B are [—($CR^1R^2$)—]$_n$, n is an integer from 1 to 10, and A and B are the same or different; $R^1$ and $R^2$ are selected from the same or different groups of H, an alkyl having 1 to 5 carbon atoms or an alkyl having 1 to 5 carbon atoms and substituted with a halogen atom or a hydroxyl group;

(3)

(IV)

wherein A is [—($CR^1R^2$)—]$_n$, n is an integer from 1 to 10; $R^1$ and $R^2$ are selected from the same or different groups of H, an alkyl having 1 to 5 carbon atoms or an alkyl having 1 to 5 carbon atoms and substituted with a halogen atom or a hydroxyl group;

In the pyridinium salt in the formula (I), X is chlorine, $R^5$ is N,N-dimethylamino group, and $R^1$, $R^2$, $R^3$ and $R^4$ are all hydrogen.

The molar ratio of the cyclic monomer, the pyridinium salt and the organic alcohol is (30:1:1)-(120:1:1).

The preparation method is carried out at a reaction temperature of 30-140° C. for a reaction time of 1-48 hours.

The preparation method specifically comprises the steps of reacting the cyclic monomer, the initiator alcohol and the organic catalyst at 30-140° C., adding a terminator, and precipitating a polymer in a precipitation solvent.

the precipitation solvent is methanol, diethyl ether, n-hexane or n-pentane.

BENEFICIAL EFFECTS

According to the invention, from the actual requirement, a novel catalytic mechanism is provided, the pyridine salt is used for independently catalyzing the bulk polymerization of the cyclic monomer, and the method has the advantages of no toxicity in reaction, simple condition, controllable process and the like.

The present invention can efficiently catalyze the synthesis of polylactone by the pyridinium salt catalyst, and has a wide applications compared with the conventional metal-containing catalyst; and with no metal residue, it can be applied to the fields of biomedicine and microelectronics.

In the present invention, the polymerization can be catalyzed by a bifunctional activation mechanism, i.e. activation of a monomeric carbonyl oxygen and activation of an initiator or chain end. Compared with the reported 4-(N, N-dimethylamino) pyridine, the catalyst provided by the invention has the advantages of no toxicity, high reaction efficiency and the like in bulk polymerization, can obtain narrower molecular weight distribution in solution-free polymerization, and can effectively inhibit transesterification.

The pyridine salt catalyzes in a bulk polymerization mode, with no additional solvent needed in a reaction system; and the higher reaction temperature of the bulk polymerization greatly reduced the adverse effect of water and air on the reaction, and overcome the transesterification of traditional 4-(N, N-dimethylamino) pyridine in bulk polymerization.

In summary, compared with the existing catalytic system, the invention has the obvious advantages of high efficiency, no toxicity, wide source, wide application range, no transesterification, no decarboxylation, no metal residue and the like.

BRIEF DESCRIPTION OF THE DRAWINGS

Hereinafter, embodiments of the present invention will be described in detail with reference to the accompanying drawings, in which.

DETAILED DESCRIPTION OF THE INVENTION

Figure 1:
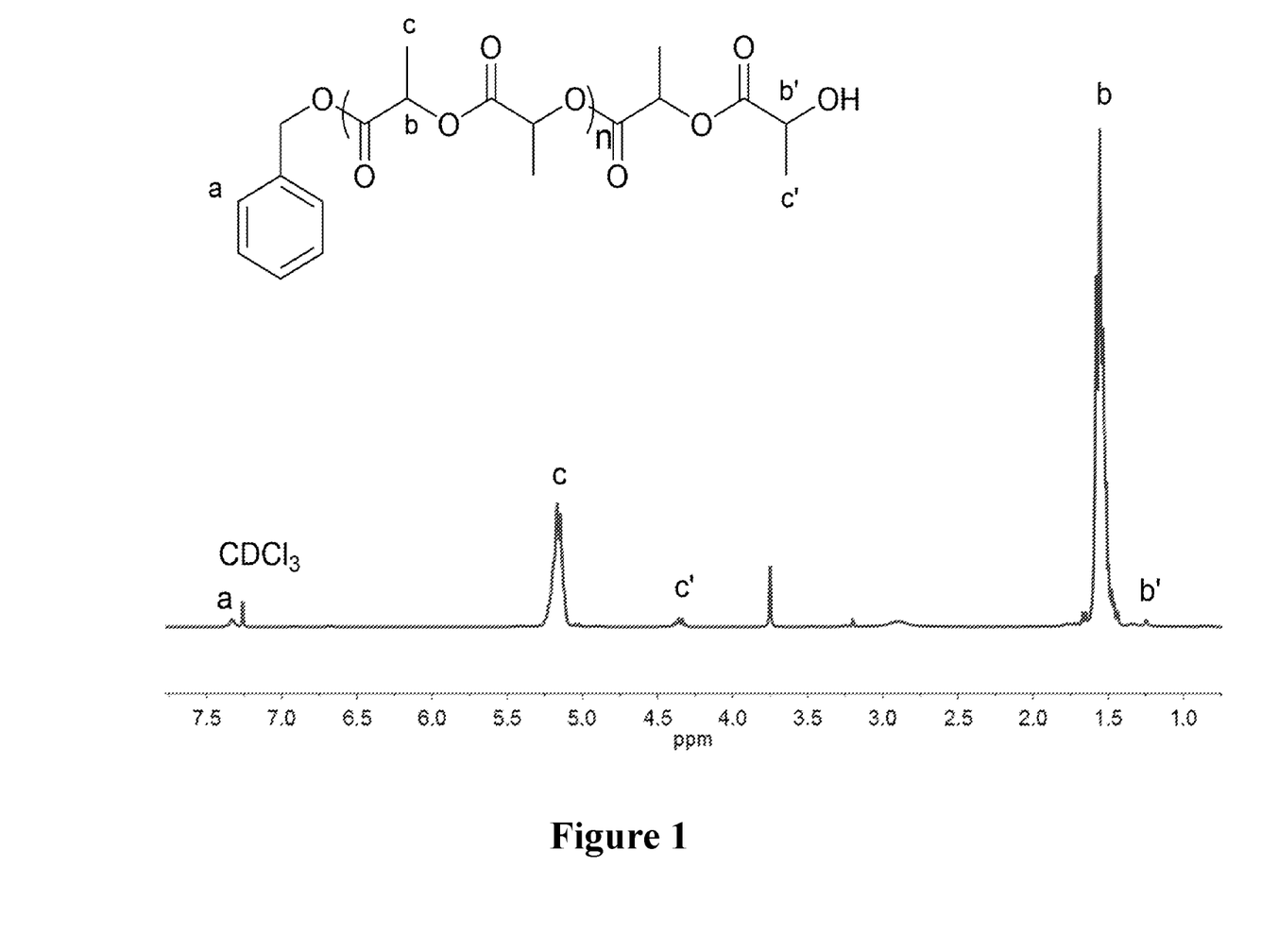
FIG. 1: $^1$H NMR of polylactic acid prepared with 4-(N, N-dimethylamino) pyridine hydrochloride catalyst.
Figure 2:
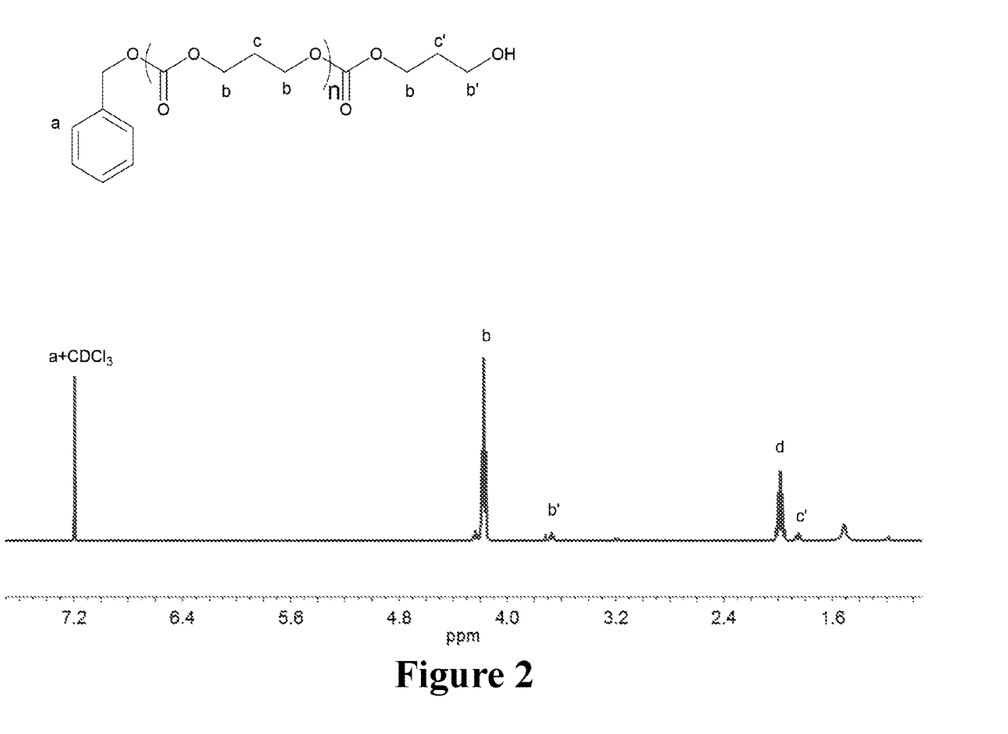
FIG. 2: $^1$H NMR of polytrimethylene carbonate prepared with 4-(N, N-dimethylamino) pyridine hydrochloride catalyst.
Figure 3:
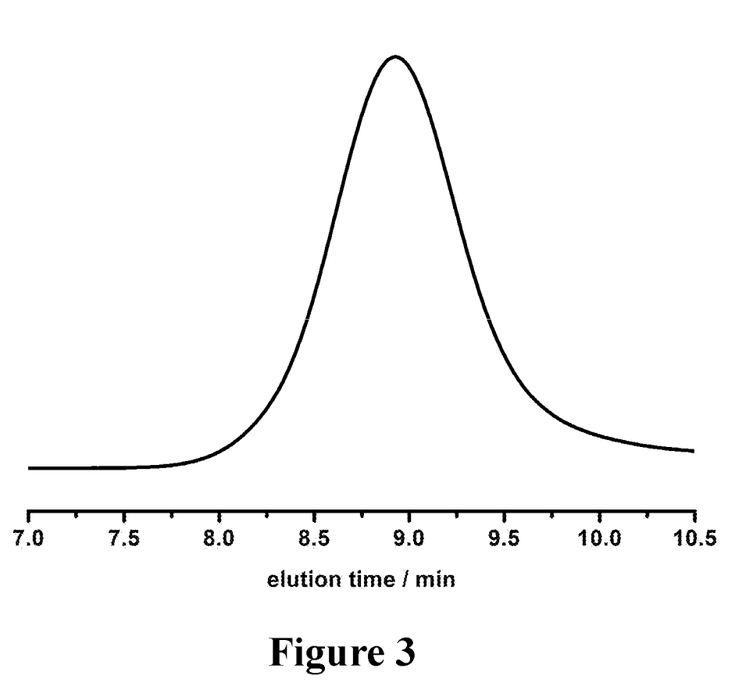
FIG. 3: a spectrum of polylactic acid prepared by 4-(N, N-dimethylamino) pyridine hydrochloride catalyst in a volume exclusion chromatography.

The invention is further illustrated by the following examples, which are intended to illustrate and not to limit the invention. Those skilled in the art will appreciate that the embodiments do not limit the invention in any way, and that suitable modifications and data changes may be made thereto without departing from the spirit and scope of the invention.

The structures of catalysts used in the examples are shown in the following table:

| No. | Structure |
|---|---|
| 16 |  |

-continued

| No. | Structure |
|---|---|
| 3 | [4-dimethylaminopyridinium with Br⁻] |
| 5 | [4-dimethylamino-2,3-diethylpyridinium with Cl⁻] |
| 7 | [4-dimethylamino-2,3,5,6-tetramethylpyridinium with I⁻] |
| 12 | [4-dimethylamino-3,5-diethyl-2,6-dimethylpyridinium with CH₃SO₃⁻] |
| 14 | [4-dimethylamino-2,3,5,6-tetraisopropylpyridinium with CF₃SO₃⁻] |
| 10 | [4-pyrrolidinyl-3,5-dimethylpyridinium with CH₃SO₃⁻] |

Example 1

In a 3 ml polymerization tube, L-lactide (0.4147 g, 2.88 mmol, 30 equiv), a catalyst (compound shown as No. 16) (0.0152 g, 0.096 mmol, 1.0 equiv), and benzyl alcohol (10 μL, 0.096 mmol, 1.0 equiv) were added and stirred mechanically at 140° C. for 1.5 h. At the end of the reaction, the reaction was stopped and the resulting crude product was slowly dropped into cold methanol, followed by precipitation by centrifugation to obtain a polymer, which was filtered and dried to constant weight to give 0.3855 g of a white solid with a conversion of 96.0%, a number average molecular weight $M_n$ of 4300 g/mol and a dispersity PDI of 1.03.

Example 2

In a 3 ml polymerization tube, L-lactide (1.660 g, 11.52 mmol, 120 equiv), a catalyst (compound shown as No. 16) (0.0152 g, 0.096 mmol, 1.0 equiv), and benzyl alcohol (10 μL, 0.096 mmol, 1.0 equiv) were added and stirred mechanically at 140° C. for 7 h. At the end of the reaction, the reaction was stopped and the resulting crude product was slowly dropped into cold methanol, followed by precipitation by centrifugation to obtain a polymer, which was filtered and dried to constant weight to give 1.403 g of a white solid with a conversion of 84.7%, a number average molecular weight $M_n$ of 13610 g/mol and a dispersity PDI of 1.04.

Example 3

In a 3 ml polymerization tube, trimethylene carbonate (0.2937 g, 2.88 mmol, 30 equiv), a catalyst (compound shown as No. 16) (0.0152 g, 0.096 mmol, 1.0 equiv), and benzyl alcohol (10 μL, 0.096 mmol, 1.0 equiv) were added and stirred mechanically at 60° C. for 24 h. At the end of the reaction, the reaction was stopped and the resulting crude product was slowly dropped into cold methanol, followed by precipitation by centrifugation to obtain a polymer, which was filtered and dried to constant weight to give 0.2620 g of transparent oil with a conversion of 91.0%, a number average molecular weight $M_n$ of 2850 g/mol and a dispersity PDI of 1.04.

Example 4

In a 3 ml polymerization tube, trimethylene carbonate (1.1761 g, 11.52 mmol, 120 equiv), a catalyst (compound shown as No. 16) (0.0152 g, 0.096 mmol, 1.0 equiv), and benzyl alcohol (10 μL, 0.096 mmol, 1.0 equiv) were added and stirred mechanically at 60° C. for 70 hours. At the end of the reaction, the reaction was stopped and the resulting crude product was slowly dropped into cold methanol, followed by precipitation by centrifugation to obtain a polymer, which was filtered and dried to constant weight to give 0.9875 g of transparent oil with a conversion of 83.4%, a number average molecular weight $M_n$ of 10300 g/mol, and a dispersity PDI of 1.05.

Example 5

In a 3 ml polymerization tube, D-lactide (0.4147 g, 2.88 mmol, 30 equiv), a catalyst (compound shown as No. 3) (0.0195 g, 0.096 mmol, 1.0 equiv), and benzyl alcohol (10 μL, 0.096 mmol, 1.0 equiv) were added and stirred mechanically at 140° C. for 1.5 h. At the end of the reaction, the reaction was stopped and the resulting crude product was slowly dropped into cold methanol, followed by precipitation by centrifugation to obtain a polymer, which was filtered and dried to constant weight to give 0.3042 g of a white solid with a conversion of 73.4%, a number average molecular weight $M_n$ of 3270 g/mol and a dispersity PDI of 1.07.

Example 6

In a 3 ml polymerization tube, L, D-lactide (0.4147 g, 2.88 mmol, 30 equiv), a catalyst (compound shown as No. 3) (0.0195 g, 0.096 mmol, 1.0 equiv), and benzyl alcohol (10 µL, 0.096 mmol, 1.0 equiv) were added and stirred mechanically at 140° C. for 1.5 hours. At the end of the reaction, the reaction was stopped and the resulting crude product was slowly dropped into cold methanol, followed by precipitation by centrifugation to obtain a polymer, which was filtered and dried to constant weight to give 0.2998 g of a white solid with a conversion of 72.3%, a number average molecular weight $M_n$ of 3200 g/mol and a dispersity PDI of 1.07.

Example 7

In a 3 ml polymerization tube, glycolide (0.3343 g, 2.88 mmol, 30 equiv), a catalyst (compound shown as No. 5) (0.0208 g, 0.096 mmol, 1.0 equiv), and benzyl alcohol (10 µL, 0.096 mmol, 1.0 equiv) were added and stirred mechanically at 100° C. for 4 hours. At the end of the reaction, the reaction was stopped and the resulting crude product was slowly dropped into cold methanol, followed by precipitation by centrifugation to obtain a polymer, which was filtered and dried to constant weight to give 0.3067 g of a white solid with a conversion of 91.7%, a number average molecular weight $M_n$ of 3300 g/mol and a dispersity PDI of 1.02.

Example 8

In a 3 ml polymerization tube, butyrolactone (0.2479 g, 2.88 mmol, 30 equiv), a catalyst (compound shown as No. 5) (0.0208 g, 0.096 mmol, 1.0 equiv), and benzyl alcohol (10 µL, 0.096 mmol, 1.0 equiv) were added and stirred mechanically at 90° C. for 24 hours. At the end of the reaction, the reaction was stopped and the resulting crude product was slowly dropped into cold methanol, followed by precipitation by centrifugation to obtain a polymer, which was filtered and dried to constant weight to give 0.2250 g of a white solid with a conversion of 90.8%, a number average molecular weight $M_n$ of 2440 g/mol and a dispersity PDI of 1.05.

Example 9

In a 3 ml polymerization tube, butyrolactone (0.2479 g, 2.88 mmol, 30 equiv), a catalyst (compound shown as No. 7) (0.0298 g, 0.096 mmol, 1.0 equiv), and benzyl alcohol (10 µL, 0.096 mmol, 1.0 equiv) were added and stirred mechanically at 60° C. for 30 hours. At the end of the reaction, the reaction was stopped and the resulting crude product was slowly dropped into cold methanol, followed by precipitation by centrifugation to obtain a polymer, which was filtered and dried to constant weight to give 0.1912 g of a white solid with a conversion of 77.1%, a number average molecular weight $M_n$ of 2090 g/mol and a dispersity PDI of 1.06.

Example 10

In a 3 ml polymerization tube, valerolactone (0.2883 g, 2.88 mmol, 30 equiv), a catalyst (compound shown as No. 7) (0.0298 g, 0.096 mmol, 1.0 equiv), and benzyl alcohol (10 µL, 0.096 mmol, 1.0 equiv) were added and stirred mechanically at 90° C. for 20 hours. At the end of the reaction, the reaction was stopped and the resulting crude product was slowly dropped into cold methanol, followed by precipitation by centrifugation to obtain a polymer, which was filtered and dried to constant weight to give 0.2422 g of a white solid with a conversion of 84.0%, a number average molecular weight $M_n$ of 2600 g/mol and a dispersity PDI of 1.04.

Example 11

In a 3 ml polymerization tube, valerolactone (0.2883 g, 2.88 mmol, 30 equiv), a catalyst (compound shown as No. 12) (0.0294, 0.096 mmol, 1.0 equiv), and benzyl alcohol (10 µL, 0.096 mmol, 1.0 equiv) were added and stirred mechanically at 90° C. for 20 hours. At the end of the reaction, the reaction was stopped and the resulting crude product was slowly dropped into cold methanol, followed by precipitation by centrifugation to obtain a polymer, which was filtered and dried to constant weight to give 0.2621 g of a white solid with a conversion of 90.9%, a number average molecular weight $M_n$ of 2730 g/mol and a dispersity PDI of 1.05.

Example 12

In a 3 ml polymerization tube, caprolactone (0.3287 g, 2.88 mmol, 30 equiv), a catalyst (compound shown as No. 12) (0.0294 g, 0.096 mmol, 1.0 equiv), and benzyl alcohol (10 µL, 0.096 mmol, 1.0 equiv) were added and stirred mechanically at 90° C. for 24 hours. At the end of the reaction, the reaction was stopped and the resulting crude product was slowly dropped into cold methanol, followed by precipitation by centrifugation to obtain a polymer, which was filtered and dried to constant weight to give 0.2790 g of a white solid with a conversion of 84.9%, a number average molecular weight $M_n$ of 3010 g/mol and a dispersity PDI of 1.06.

Example 13

In a 3 ml polymerization tube, caprolactone (0.3287 g, 2.88 mmol, 30 equiv), a catalyst (compound shown as No. 14) (0.0469 g, 0.096 mmol, 1.0 equiv), and benzyl alcohol (10 µL, 0.096 mmol, 1.0 equiv) were added and stirred mechanically at 90° C. for 28 hours. At the end of the reaction, the reaction was stopped and the resulting crude product was slowly dropped into cold methanol, followed by precipitation by centrifugation to obtain a polymer, which was filtered and dried to constant weight to give 0.2867 g of a white solid with a conversion of 87.2%, a number average molecular weight $M_n$ of 2980 g/mol and a dispersity PDI of 1.05.

Example 14

In a 3 ml polymerization tube, glycolide (0.3343 g, 2.88 mmol, 30 equiv), a catalyst (compound shown as No. 14) (0.0469 g, 0.096 mmol, 1.0 equiv), and benzyl alcohol (10 µL, 0.096 mmol, 1.0 equiv) were added and stirred mechanically at 100° C. for 36 hours. At the end of the reaction, the reaction was stopped and the resulting crude product was slowly dropped into cold methanol, followed by precipitation by centrifugation to obtain a polymer, which was filtered and dried to constant weight to give 0.2980 g of a white solid with a conversion of 89.1%, a number average molecular weight $M_n$ of 3380 g/mol and a dispersity PDI of 1.03.

Example 15

In a 3 ml polymerization tube, glycolide (0.3343 g, 2.88 mmol, 30 equiv), a catalyst (compound shown as No. 10) (0.0234 g, 0.096 mmol, 1.0 equiv), and benzyl alcohol (10 μL, 0.096 mmol, 1.0 equiv) were added and stirred mechanically at 100° C. for 36 hours. At the end of the reaction, the reaction was stopped and the resulting crude product was slowly dropped into cold methanol, followed by precipitation by centrifugation to obtain a polymer, which was filtered and dried to constant weight to give 0.2850 g of a white solid with a conversion of 85.2%, a number average molecular weight $M_n$ of 3072 g/mol and a dispersity PDI of 1.07.

Example 16

In a 3 ml polymerization tube, L-lactide (0.8294 g, 5.76 mmol, 60 equiv), a catalyst (compound shown as No. 16) (0.0152 g, 0.096 mmol, 1.0 equiv), and benzyl alcohol (10 μL, 0.096 mmol, 1.0 equiv) were added and stirred mechanically at 140° C. for 3 hours. At the end of the reaction, the reaction was stopped and the resulting crude product was slowly dropped into cold methanol, followed by precipitation by centrifugation to obtain a polymer, which was filtered and dried to constant weight to give 0.7090 g of a white solid with a conversion of 85.5%, a number average molecular weight $M_n$ of 7490 g/mol and a dispersity PDI of 1.06.

The invention claimed is:

1. A method for preparing polylactone carrying out a ring opening polymerization of a cyclic monomer in the presence of an organic catalyst and an organic alcohol as an initiator to obtain a polylactone,
wherein the organic catalyst is a pyridinium salt shown as formula I:

(I)

wherein:
when $R^5$ is hydrogen, $R^1$, $R^2$, $R^3$ and $R^4$ are independently selected from hydrogen, methyl, ethyl, isopropyl, and C1-C4 alkyls substituted by one or more substituents selected from hydroxyl, phenyl, and cyano; X is one selected from fluorine, chlorine, bromine, iodine, methanesulfonic acid, ethanesulfonic acid, p-toluenesulfonic acid, trifluoromethanesulfonic acid, trichloromethanesulfonic acid, trifluoroacetic acid, trichloroacetic acid, and benzenesulfonic acid;
when $R^5$ is selected from N,N-dimethylamino, $R^1$, $R^2$, $R^3$ and $R^4$ are independently selected from hydrogen, methyl, ethyl, isopropyl, tert-butyl, sec-butyl, and C1-C10 alkyls substituted by one or more substituents selected from hydroxyl, phenyl, and cyano, with the proviso that $R^1$, $R^2$, $R^3$, and $R^4$ are not simultaneously hydrogen; X is one selected from fluoro, chloro, bromo, iodo, methanesulfonic acid, ethanesulfonic acid, p-toluenesulfonic acid, trifluoromethanesulfonic acid, trichloromethanesulfonic acid, trifluoroacetic acid, trichloroacetic acid and benzenesulfonic acid; and
when $R^5$ is selected from N-pyrrolidinyl, $R^1$, $R^2$, $R^3$ and $R^4$ are independently selected from hydrogen, methyl, ethyl, isopropyl, tert-butyl, sec-butyl, and C1-C10 alkyls substituted by one or more substituents selected from hydroxyl, phenyl, and cyano; X is one selected from fluoro, chloro, bromo, iodo, methanesulfonic acid, ethanesulfonic acid, p-toluenesulfonic acid, trifluoromethanesulfonic acid, trichloromethanesulfonic acid, trifluoroacetic acid, trichloroacetic acid and benzenesulfonic acid.

2. The preparation method of claim 1, wherein the organic catalyst is selected from 3. The preparation method of claim 1, wherein R in the initiator organic alcohol ROH is an alkyl or a phenyl group, and the alkyl is a linear, branched or cyclic chain having 1 to 22 carbon atoms.

4. The preparation method of claim 3, wherein the organic alcohol is methanol, ethanol, pentaerythritol, butynol, phenylpropanol, or benzyl alcohol.

5. The preparation method of claim 1, wherein the cyclic monomer is one of lactones of formula (II), carbonates of formula (III), and lactides of formula (IV), $$\text{(II)}$$

$$\text{(III)}$$

$$\text{(IV)}$$

wherein, in formula (II), A is $[-(CR^1R^2)-]_n$, n is an integer from 2 to 10; $R^1$ and $R^2$ are independently selected from H, unsubstituted C1-C5 alkyls, and C1-C5 alkyls substituted with a halogen or a hydroxyl group;

wherein, in formula (III), A and B are $[-(CR^1R^2)-]$, n is an integer from 1 to 10, and A and B are the same or different; $R^1$ and $R^2$ are independently selected from H, C1-C5 alkyls, and C1-C5 substituted with a halogen atom or a hydroxyl group;

Wherein, in formula (IV), A is $[-(CR^1R^2)-]_n$, n is an integer from 1 to 10; $R^1$ and $R^2$ are independently selected from H, C1-C5 alkyls, and C1-C5 alkyls substituted with a halogen atom or a hydroxyl group.

6. The preparation method of claim 5, wherein the lactone cyclic monomer is butyrolactone, valerolactone, or caprolactone; the carbonate cyclic monomer is trimethylene carbonate, dimethyl carbonate and diethyl carbonate; and the lactide cyclic monomer is glycolide or lactide.

7. The preparation method of claim 1, wherein a molar ratio of the cyclic monomer, the organic catalyst, and the organic alcohol is (30:1:1)-(120:1:1).

8. The preparation method of claim 1, wherein further comprising adding a terminator to the reaction mixture, and precipitating a polymer in a precipitation solvent that is methanol, diethyl ether, n-hexane, or n-pentane.

9. The preparation method of claim 1, wherein the ring opening polymerization is carried out at a temperature of 30-140° C. for 1-48 hours.

* * * * *